Patented Aug. 18, 1936

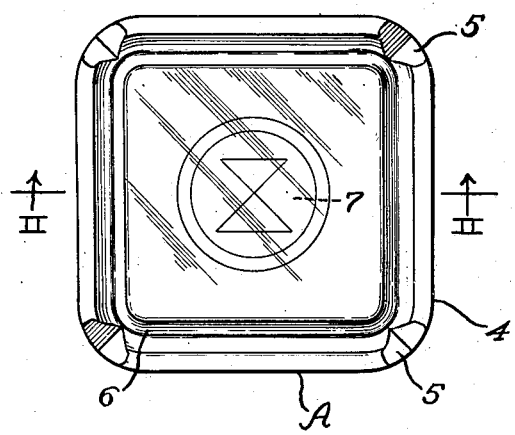
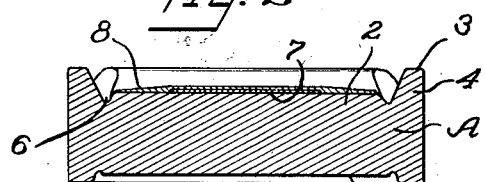
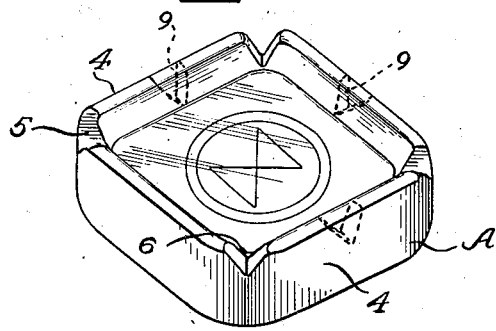

2,051,625

UNITED STATES PATENT OFFICE 2,051,625

SOAP TO BE USED FOR ADVERTISING PURPOSES

James Arthur Watt, Chicago, Ill.

Application June 5, 1935, Serial No. 25,003

2 Claims. (Cl. 87—23)

The present invention relates to improvements in soap cakes or bars and has for an object the provision of ways and means of making a cake or a bar of soap wherein a pocket is formed within which decorative matter may be applied and protected against action of water.

Another object of the present invention is to provide a cake of soap or a bar of soap with advertising or decorative matter applied to the surface of the cake or bar within a pocket formed in the cake, and with drainage means surrounding the pocket to prevent accumulation of water on the decorative matter.

A further object of the present invention is to provide a soap cake or bar to which advertising or decorative matter is applied, and protected from dissolution by a thin coat of paraffin or other like transparent substance, and the provision of raised ribs or drainage means for preventing accumulation of water on the decorative or advertising matter.

The above, other and further objects of the present invention will be apparent from the following description and accompanying drawing.

The accompanying drawing illustrates one embodiment of the present invention and the views thereof are as follows:

Figure 1 is a plan view of a cake or bar of soap constructed in accordance with the principles of the present invention.

Figure 2 is a vertical sectional view taken substantially in the plane indicated by the line II—II of Figure 1.

Figure 3 is an isometric view of the cake of Figure 1, showing in dotted lines a modified form of water escape means provided in the flanges or ribs.

The drawing will now be explained:

The cake of soap as illustrated consists of a body A having an under surface 1 and an upper face 2 which is formed as a depression inwardly of the top margin 3 of the cake. Surrounding the depressed face 2 are flanges or ribs 4 with notches 5 at intervals in the length of the flanges or ribs to provide water escapement means from the depression or pocket formed in the cake.

The surface 2 of the cake is separated from the flanges or ribs 4 by means of grooves 6 which constitute gutters for the accumulation of any moisture within the pocket of the cake and which grooves communicate with the notches 5 for ready escape of such accumulated water. The construction of the pocket in the manner described makes possible the ready escape of water from within the pocket whenever the cake of soap is laid on a flat surface. Furthermore, should the cake be laid upside-down, that is, with the surface 2 towards the bottom, the flanges or ribs 4 protect the face 2 from contact with a surface on which the cake may be laid.

Against the surface of the face 2 of the cake, decorative matter, such as advertising matter or the like, is applied, and may consist of a thin sheet of paper 7 carrying the decorative or advertising matter and may be made by means of decalcomania transfer or any other suitable manner. In order to protect the decorative matter from the action of water, in the use of the cake, a protective covering 8 is applied over the decorative matter 7. This protective covering is transparent and impervious to water, also having such characteristics as to very readily adhere to the cake of soap. Paraffin has been found satisfactory for the purpose mentioned.

The provision of the pocket or depression within the cake, the application of decorative matter to the surface of the pocket, and the protection thereof by paraffin, together with the novel drainage features of the present invention, such as the ribs 4 and the gutters 6 with escapements 5 fully protect the decorative matter 7 from dissolution by water until such times as the cake is worn thin enough so that it is ready to be discarded.

It will be readily apparent that as the cake is used, the ribs or ridges 4 gradually wear away, so that in time the cake becomes so thin as to be readily unusable, at which time it may be discarded. However, by reason of the novel features of the present invention, the decorative or advertising matter 7, applied to the cake in the manner stated, retains its full effectiveness as it is protected against the action of water in the use of the cake.

The protective covering 8, when applied over the decorative matter 7, may be slightly crowned, if desired, thereby affording a ready shed for any water to divert it into the gutter 6 of the cake, when the cake is laid on its bottom surface. It will thus be seen that there is no opportunity afforded for water to accumulate within the depression or pocket 2 in such manner as to in any way damage the decorative or advertising matter 7 applied to the cake.

Another advantage afforded by the ribs or flanges 4 is in the use of the cake, as the flanges or ribs provide margins whereby the cake of soap may be readily grasped and prevented from slipping from the hands of a user.

It will be observed that the present invention improves the advertising value of soap by so constructing the soap cakes or bars that the advertising matter is fully protected against deterioration or dissolution for substantially the entire life of the cake or bar, so that its advertising value remains up to the time it is discarded. That is to say, the advertising or decorative matter is permanently preserved on the soap throughout its life and may at all times be readily observed through the transparent protective coating or covering 8.

If desired, decorative matter other than paper may be readily applied to soap cakes or bars in accordance with the principles of the present invention, in which event such other decorative matter may be applied as stated, and suitably covered by a transparent protective covering 8.

While the illustrated form of soap cake has been shown with the escape notches 5 at the corners of the cake, it is of course understood that these notches might be placed elsewhere than at such corners, for example, as indicated in dotted lines at 9 in Figure 3. In the event such escapement notches 9 were utilized, then, of course, the corner notches would not be present, the ridges or ribs 4 being closed at the corners and open intermediate these corners.

The grooves 6 provide means for receiving the paraffin, as it is poured over the decorative matter, to effect a complete protective seal for the decorative matter.

I am aware that many changes may be made and numerous details of construction may be varied through a wide range without departing from the principles of this invention, and I, therefore do not purpose limiting the patent granted hereon otherwise than is necessitated by the prior art.

The invention is claimed as follows:

1. As an article of manufacture, a bar of soap having a central recess defined by an upstanding outer marginal rib extending around the top of the bar, the bottom of said recess having advertising matter therein and being raised and having a substantially continuous channel between said raised portion and said rib, said rib being notched to allow water to flow freely from the bottom of said channel and out of said recess when said bar is positioned with said advertising matter uppermost so as to prevent water from accumulating in said recess and thus damaging the advertising matter in the bottom of the recess.

2. As an article of manufacture, a bar of soap having substantially a central recess defined by a relatively deep upstanding outer marginal rib extending around the top of the bar, the bottom of said recess having separate advertising matter therein disposed in an intermediate plane located a substantial distance below the top of said rib so as to minimize contact with the same during use of the bar, said rib having a relatively wide notch to allow water to flow freely off of said advertising matter and out of said recess when said bar is positioned with said advertising matter uppermost, said notch having its bottom disposed below the plane of the advertising matter so as to prevent water from accumulating in said recess and thus damaging the advertising matter in the bottom of said recess.

JAMES ARTHUR WATT.